United States Patent
Nunnink et al.

(10) Patent No.: US 7,614,563 B1
(45) Date of Patent: Nov. 10, 2009

(54) SYSTEM AND METHOD FOR PROVIDING DIFFUSE ILLUMINATION IN A SYMBOLOGY READER

(75) Inventors: Laurens Nunnink, Simpelveid (NL); William H. Equitz, Waban, MA (US); Carl W. Gerst, Boston, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 481 days.

(21) Appl. No.: 11/321,702

(22) Filed: Dec. 29, 2005

(51) Int. Cl.
*G06K 7/10* (2006.01)
(52) U.S. Cl. .................... 235/473; 235/462.42
(58) Field of Classification Search ............ 235/462.06, 235/462.2, 462.21, 462.22, 462.35, 462.42, 235/472.01, 473; 362/27
See application file for complete search history.

(56) References Cited

U.S. PATENT DOCUMENTS

| | | | |
|---|---|---|---|
| 2,357,378 | A | 9/1944 | Benford |
| 3,857,626 | A | 12/1974 | Rosenberger et al. |
| 3,961,198 | A | 6/1976 | Angst et al. |
| 4,282,425 | A | 8/1981 | Chadima et al. |
| 4,570,057 | A | 2/1986 | Chadima, Jr. et al. |
| 4,766,300 | A | 8/1988 | Chadima, Jr. et al. |
| 4,820,911 | A | 4/1989 | Arackellian et al. |
| 5,019,699 | A | 5/1991 | Koenck |
| 5,149,948 | A | 9/1992 | Chisholm |
| 5,177,346 | A | 1/1993 | Chisholm |
| 5,258,606 | A | 11/1993 | Chadima, Jr. et al. |
| 5,291,009 | A | 3/1994 | Roustaei |
| 5,313,373 | A | 5/1994 | Bjorner et al. |
| 5,319,182 | A | 6/1994 | Havens et al. |
| 5,331,176 | A | 7/1994 | San't Anselmo et al. |
| 5,349,172 | A | 9/1994 | Roustaei |
| 5,354,977 | A | 10/1994 | Roustaei |
| 5,378,883 | A | 1/1995 | Batterman et al. |
| 5,406,060 | A | 4/1995 | Gitin |
| 5,408,084 | A | 4/1995 | Brandorff et al. |
| 5,422,472 | A * | 6/1995 | Tavislan et al. ........ 235/472.01 |

(Continued)

FOREIGN PATENT DOCUMENTS

EP          0185782          3/1989

(Continued)

OTHER PUBLICATIONS

CCS Inc., "LFX-series Lights", http://www.ccs-inc.co.jp/cgi-bin/hp.cgi?menu=102-115-01e Date Unknown.

(Continued)

*Primary Examiner*—Kumiko C Koyama
(74) *Attorney, Agent, or Firm*—William A. Loginov

(57) ABSTRACT

An illumination system and method for use in a handheld symbology reader that employs a grid of reflecting elements applied to a transparent plate adapted to project a highly diffuse and uniform illumination on a subject. The grid defines a geometry with a large number of transparent spaces between grid elements through which an image of the subject can be acquired. A light source array is configured to project light into the grid at a right angle via a light pipe having a distal beveled edge or side projecting light sources. Another light source may be employed to illuminate second light pipe with a chamfered edge to create low-angle illumination.

29 Claims, 11 Drawing Sheets

U.S. PATENT DOCUMENTS

| | | | |
|---|---|---|---|
| 5,430,285 A | 7/1995 | Karpen et al. |
| 5,461,417 A | 10/1995 | White et al. |
| 5,463,214 A | 10/1995 | Longacre, Jr. et al. |
| 5,469,294 A | 11/1995 | Wilt et al. |
| 5,481,098 A | 1/1996 | Davis et al. |
| 5,484,994 A | 1/1996 | Roustaei |
| 5,500,516 A | 3/1996 | Durbin |
| 5,504,367 A | 4/1996 | Wang et al. |
| 5,514,858 A | 5/1996 | Ackley |
| 5,515,452 A | 5/1996 | Penkethman et al. |
| 5,532,467 A | 7/1996 | Roustaei et al. |
| 5,569,902 A | 10/1996 | Wood et al. |
| 5,585,616 A | 12/1996 | Roxby et al. |
| 5,586,212 A | 12/1996 | McConica et al. |
| 5,591,955 A | 1/1997 | Laser |
| 5,598,007 A | 1/1997 | Bunce et al. |
| 5,606,160 A | 2/1997 | Tani et al. |
| 5,619,029 A | 4/1997 | Roxby et al. |
| 5,623,137 A | 4/1997 | Powers et al. |
| 5,659,167 A | 8/1997 | Wang et al. |
| 5,684,290 A | 11/1997 | Arackellian et al. |
| 5,697,699 A | 12/1997 | Seo et al. |
| 5,703,348 A | 12/1997 | Suzuki et al. |
| 5,723,868 A | 3/1998 | Hammond, Jr. et al. |
| 5,734,153 A | 3/1998 | Swartz et al. |
| 5,750,974 A | 5/1998 | Sasaki et al. |
| 5,756,981 A | 5/1998 | Roustaei et al. |
| 5,773,810 A | 6/1998 | Hussey et al. |
| 5,777,314 A | 7/1998 | Roustaei |
| 5,780,834 A | 7/1998 | Havens et al. |
| 5,783,811 A | 7/1998 | Feng et al. |
| 5,786,586 A | 7/1998 | Pidhirny et al. |
| 5,793,033 A | 8/1998 | Feng et al. |
| 5,811,784 A | 9/1998 | Tausch et al. |
| 5,834,754 A | 11/1998 | Feng et al. |
| 5,859,418 A | 1/1999 | Li et al. |
| 5,861,910 A | 1/1999 | McGarry et al. |
| 5,886,338 A | 3/1999 | Arackellian et al. |
| 5,894,348 A | 4/1999 | Bacchi et al. |
| 5,907,148 A | 5/1999 | Iwafuchi et al. |
| 5,920,643 A | 7/1999 | White et al. |
| 5,949,057 A | 9/1999 | Feng |
| 5,969,321 A | 10/1999 | Danielson et al. |
| 5,984,494 A | 11/1999 | Chapman et al. |
| 5,992,751 A | 11/1999 | Laser |
| 6,022,124 A | 2/2000 | Bourn et al. |
| 6,033,090 A | 3/2000 | Seo |
| 6,034,379 A | 3/2000 | Bunte et al. |
| 6,036,095 A | 3/2000 | Seo |
| 6,039,254 A | 3/2000 | Froese-Peeck et al. |
| 6,042,012 A | 3/2000 | Olmstead et al. |
| 6,045,047 A | 4/2000 | Pidhirny et al. |
| 6,060,722 A | 5/2000 | Havens et al. |
| 6,105,869 A | 8/2000 | Scharf et al. |
| 6,119,939 A | 9/2000 | Schwartz et al. |
| 6,141,046 A | 10/2000 | Roth et al. |
| 6,158,661 A | 12/2000 | Chadima, Jr. et al. |
| 6,164,544 A | 12/2000 | Schwartz et al. |
| 6,210,013 B1 | 4/2001 | Bousfield |
| 6,223,986 B1 | 5/2001 | Bobba et al. |
| 6,234,397 B1 | 5/2001 | He et al. |
| 6,247,645 B1 | 6/2001 | Harris et al. |
| 6,249,008 B1 | 6/2001 | Bunte et al. |
| 6,250,551 B1 | 6/2001 | He et al. |
| 6,260,763 B1 | 7/2001 | Svetal |
| 6,267,294 B1 | 7/2001 | Stern et al. |
| 6,283,374 B1 | 9/2001 | Fantone et al. |
| 6,340,114 B1 | 1/2002 | Correa et al. |
| 6,347,163 B2 | 2/2002 | Roustaei |
| 6,352,204 B2 | 3/2002 | Hattersley et al. |
| 6,360,948 B1 | 3/2002 | Yang et al. |
| 6,371,374 B1 | 4/2002 | Schwartz et al. |
| 6,385,352 B1 | 5/2002 | Roustaei |
| 6,385,507 B1 | 5/2002 | Buijtels et al. |
| 6,405,925 B2 | 6/2002 | He et al. |
| 6,429,934 B1 | 8/2002 | Dunn et al. |
| 6,435,411 B1 | 8/2002 | Massieu et al. |
| 6,491,223 B1 | 12/2002 | Longacre, Jr. et al. |
| 6,513,714 B1 | 2/2003 | Davis et al. |
| 6,592,040 B2 | 7/2003 | Barkan |
| 6,601,768 B2 | 8/2003 | McCall et al. |
| 6,607,128 B1 | 8/2003 | Schwartz et al. |
| 6,659,350 B2 | 12/2003 | Schwartz et al. |
| 6,661,521 B1 | 12/2003 | Stern et al. |
| 6,831,290 B2 * | 12/2004 | Mentzer ..................... 250/577 |
| 6,832,725 B2 | 12/2004 | Gardiner et al. |
| 7,021,542 B2 | 4/2006 | Patel et al. |
| 7,044,377 B2 | 5/2006 | Patel et al. |
| 7,090,132 B2 | 8/2006 | Havens et al. |
| 7,131,587 B2 | 11/2006 | He et al. |
| 7,163,149 B2 | 1/2007 | He et al. |
| 7,187,825 B2 | 3/2007 | Lim et al. |
| 7,204,418 B2 | 4/2007 | Josep et al. |
| 7,204,420 B2 | 4/2007 | Barken et al. |
| 7,270,274 B2 | 9/2007 | Hennick et al. |
| 2002/0000472 A1 | 1/2002 | Hattersley et al. |
| 2002/0096566 A1 | 7/2002 | Schwartz et al. |
| 2003/0058631 A1* | 3/2003 | Yoneda ....................... 362/27 |
| 2005/0087601 A1 | 4/2005 | Gerst et al. |
| 2006/0027659 A1 | 2/2006 | Patel et al. |
| 2006/0032921 A1 | 2/2006 | Gerst et al. |
| 2006/0133757 A1 | 6/2006 | Nunnink |
| 2007/0090193 A1 | 4/2007 | Nunnink et al. |
| 2007/0152064 A1 | 7/2007 | Nunnink et al. |

FOREIGN PATENT DOCUMENTS

| | | |
|---|---|---|
| WO | WO-99/49347 | 9/1999 |
| WO | WO-09949347 | 9/1999 |
| WO | WO-01/63258 | 8/2001 |
| WO | WO-02075637 | 9/2002 |
| WO | WO-2004/0064 | 1/2004 |
| WO | WO-2005043449 | 5/2005 |

OTHER PUBLICATIONS

Cognex Corporation, "DataMan 7500 Series Handheld Models", *Codnex Machine Vision System and Machine Vision Sensors*, (2009).

Cognex Corporation, "DataMan 6500 Series, Quick Reference, 2004.

* cited by examiner

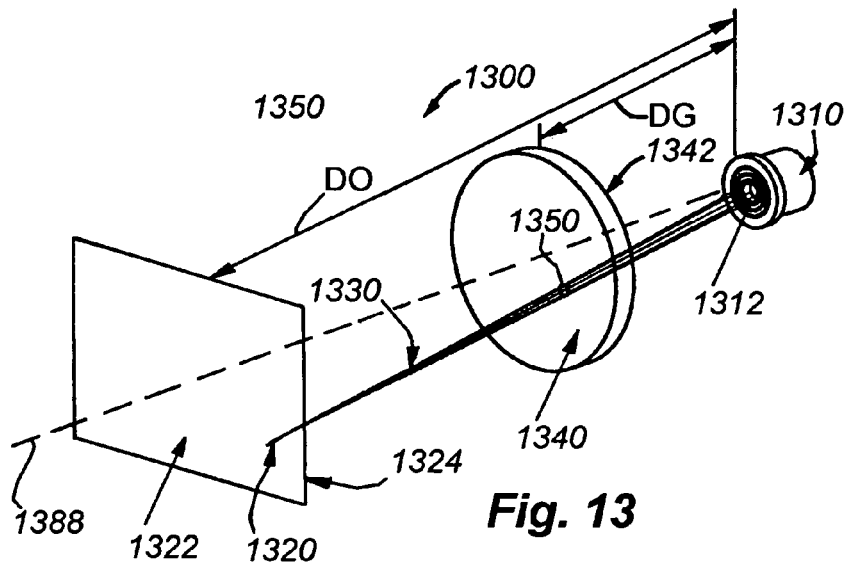
Fig. 13
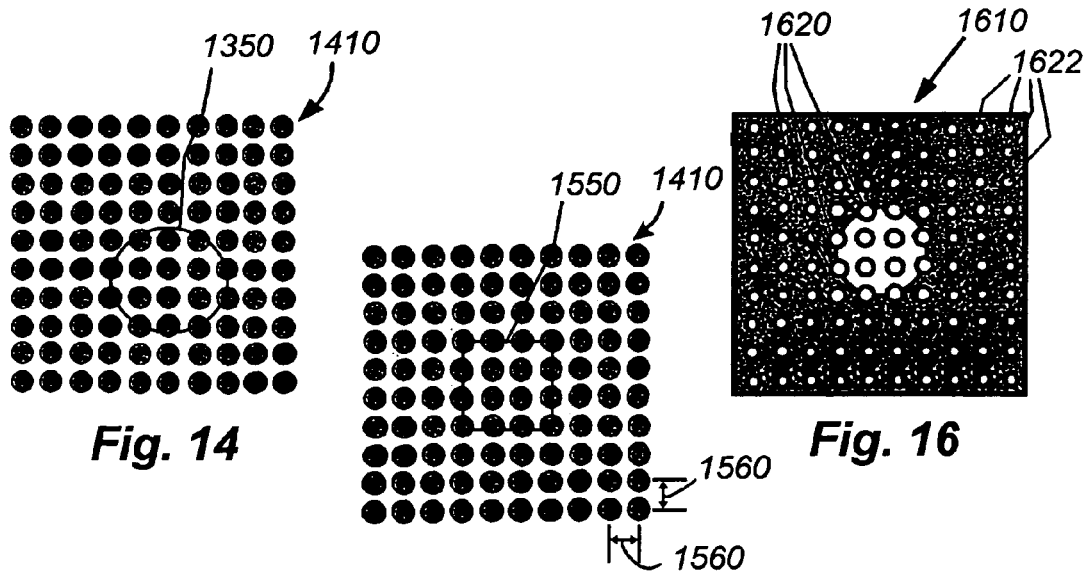
Fig. 14
Fig. 15
Fig. 16

SYSTEM AND METHOD FOR PROVIDING DIFFUSE ILLUMINATION IN A SYMBOLOGY READER

BACKGROUND OF THE INVENTION

1. Field of the Invention

This invention relates to machine vision systems and symbology readers that employ machine vision and more particularly to illuminators for the same.

2. Background Information

Machine vision systems use image acquisition devices that include camera sensors to deliver information on a viewed subject. The system then interprets this information according to a variety of algorithms to perform a programmed decision-making and/or identification function. For an image to be most-effectively acquired by a sensor in the visible, and near-visible light range, the subject should be properly illuminated.

In the example of symbology reading (also commonly termed "barcode" scanning) using an image sensor, proper illumination is highly desirable. Symbology reading entails the aiming of an image acquisition sensor (CMOS camera, CCD, etc.) at a location on an object that contains a symbol (a "barcode"), and acquiring an image of that symbol. The symbol contains a set of predetermined patterns that represent an ordered group of characters or shapes from which an attached data processor (for example, a microcomputer) can derive useful information about the object (e.g. its serial number, type, model, price, etc.). Symbols/barcodes are available in a variety of shapes and sizes. Two of the most commonly employed symbol types used in marking and identifying objects are the so-called one-dimensional barcode, consisting of a line of vertical stripes of varying width and spacing, and the so-called two-dimensional barcode consisting of a two-dimensional array of dots or rectangles.

By way of background FIG. 1 shows an exemplary scanning system 100 adapted for handheld operation. An exemplary handheld scanning appliance or handpiece 102 is provided. It includes a grip section 104 and a body section 106. An image formation system 151, shown in phantom, can be controlled and can direct image data to an onboard embedded processor 109. This processor can include a scanning software application 113 by which lighting is controlled, images are acquired and image data is interpreted into usable information (for example, alphanumeric strings derived from the symbols (such as the depicted two-dimensional barcode image 195). The decoded information can be directed via a cable 111 to a PC or other data storage device 112 having (for example) a display 114, keyboard 116 and mouse 118, where it can be stored and further manipulated using an appropriate application 121. Alternatively, the cable 111 can be directly connected to an interface in the scanning appliance and an appropriate interface in the computer 112. In this case the computer-based application 121 performs various image interpretation/decoding and lighting control functions as needed. The precise arrangement of the handheld scanning appliance with respect to an embedded processor, computer or other processor is highly variable. For example, a wireless interconnect can be provided in which no cable 111 is present. Likewise, the depicted microcomputer can be substituted with another processing device, including an onboard processor or a miniaturized processing unit such as a personal digital assistant or other small-scale computing device.

The scanning application 113 can be adapted to respond to inputs from the scanning appliance 102. For example, when the operator toggles a trigger 122 on the hand held scanning appliance 102, an internal camera image sensor (that is part of the image formation system 151) acquires an image of a region of interest 131 on an object 105. The exemplary region of interest includes a two-dimensional symbol 195 that can be used to identify the object 105. Identification and other processing functions are carried out by the scanning application 113, based upon image data transmitted from the hand held scanning appliance 102 to the processor 109. A visual indicator 141 can be illuminated by signals from the processor 109 to indicate a successful read and decode of the symbol 195.

In reading symbology or other subjects of interest, the type of illumination employed is of concern. Where symbology and/or other viewed subjects are printed on a flat surface with contrasting ink or paint, a diffuse, high-angle "bright field" illumination may best highlight these features for the sensor. By high-angle it is meant, generally, light that strikes the subject nearly perpendicularly (normal) or at an angle that is typically no more than about 45 degrees from perpendicular (normal) to the surface of the item being scanned. Such illumination is subject to substantial reflection back toward the sensor. By way of example, barcodes and other subjects requiring mainly bright field illumination may be present on a printed label adhered to an item or container, or on a printed field in a relatively smooth area of item or container.

Conversely, where a symbology or other subject is formed on a more-irregular surface, or is created by etching or peening a pattern directly on the surface, the use of highly reflective bright field illumination may be inappropriate. A peened/etched surface has two-dimensional properties that tend to scatter bright field illumination, thereby obscuring the acquired image. Where a viewed subject has such decidedly two-dimensional surface texture, it may be best illuminated with dark field illumination. This is an illumination with a characteristic low angle (approximately 45 degrees or less, for example) with respect to the surface of the subject (i.e. an angle of more than approximately 45 degrees with respect to normal). Using such low-angle, dark field illumination, two-dimensional surface texture is contrasted more effectively (with indents appearing as bright spots and the surroundings as shadow) for better image acquisition.

Often, an area of interest is best illuminated with highly diffuse illumination, typically projected at a relatively high angle onto the surface being viewed. Commonly owned U.S. patent application Ser. No. 11/257,411 entitled INTEGRATED ILLUMINATION ASSEMBLY FOR SYMBOLOGY READER, by Laurens W. Nunnink, et al., the teachings of which are expressly incorporated herein by reference, describes a handheld symbology reader with an illumination assembly that incorporates a light pipe projecting a dark field illumination pattern surrounding a conical diffuser that, via a reflector transmits a direct diffuse illumination pattern from a plurality or rearward-projecting light emitting diodes (LEDs). This diffuser employs a multi-step reflector to better spread the light from the rearward projecting LEDs throughout the conical surface for the best spread pattern.

While a diffuser of this type is highly effective in illuminating surfaces, it requires a central aperture through which the imager lens receives light from the subject. This aperture, along with the need to redirect and spread the light from a limited number of discrete number of light sources into a wide field, may result in some regions on the surface that are more-dimly lit than others (a mild spotting effect).

Conversely, a diffuse illuminator employing a perimeter array of light sources that project light inwardly to a regularly spaced grid assembly is commercially available from CCS of Japan. The grid assembly is, in essence a plate of transparent material having a series of reflective spots (a "grid") applied to one side and opposite a fully transparent side. The light is internally reflected to bounce off of the spots and through the opposing transparent side, and toward a subject. The image resides on the grid side of the illuminator and views the subject through the grid. This illuminator provides a very consistent light across its surface that is substantially unbroken due to the lack of a large central aperture and that avoids spotting effects due to the even spread of light around the matrix of the grid. This light spread is generated by a substantially continuous array of light sources (red LEDs, for example) that are provided around the perimeter of the grid. In particular, the unique geometry of the grid projects the array's light downwardly onto the subject, while blocking upward transmission of light from the array. The grid includes sufficient open space between grid elements (reflectors) so that, at the camera's normal standoff from the grid, it appears largely invisible in the acquired image, much like a window screen viewed at a distance.

However, this type of diffuse illuminator is specifically adapted for fixed-mount applications, in which the subject is provided at a stationary inspection location with a fixed camera located thereabove. The illuminator is also relatively large in footprint (30 or more centimeters square in many versions. In addition, the illumination array is housed in a wide framework that encircles the grid, thus providing a significant degree of non-projecting space along the overall surface area of the grid. In all, this type of illuminator is not adapted for use in a movable handheld environment where the maximum amount of surface area should be devoted to illumination and the overall surface area should be minimized.

SUMMARY OF THE INVENTION

This invention overcomes the disadvantages of the prior art by providing an illumination system and method for use in a handheld symbology reader that employs a grid assembly having a transparent plate with an imager-facing side and a subject-facing side, in which the imager-facing side includes an applied pattern of reflecting spots or elements adapted, to project a highly diffuse and uniform illumination on a subject. The grid assembly defines a geometry with a large number of transparent spaces between grid elements through which an image of the subject can be acquired, but that is otherwise substantially regular and continuous (tessellated) across the entire inner opening of the reader. The area of the grid assembly is enhanced, and the size of the reader opening is minimized, by locating the light source array so that is projects into the grid assembly at a right angle. The light sources can, thus, be mounted on a circuit board that is coaxial with the imager's optical axis. In this manner, the light array can be provided along with another ring of light sources (potentially on the same circuit board), which are employed to illuminate an external light pipe with a chamfered edge to create low-angle, illumination. The light for illuminating the grid assembly can be provided using an inner light pipe with a distal beveled edge (typically a 45-degree bevel) that bends light from the sources at a 90-degree angle radially into the perimeter edge of the transparent plate of the grid assembly.

In one illustrative embodiment, the grid assembly is provided behind the dark field light pipe's proximal (rearward, toward the interior of the reader) end, and the grid light sources are directed further proximally (rearwardly) into either a 90-degree-bend light pipe or a continuously curving (parabolic, for example) grid. In another embodiment, the grid assembly is located forwardly, near the chamfered edge of the dark field light pipe and employs a 90-degree-bend light pipe to direct light from an array of forwardly (toward the distal or outer end of the reader) projecting grid light sources that are coaxial with the dark field light pipe light sources. The bending light pipe and dark field light pipe can be optically isolated from each other by an intermediate shield or coating that prevents migration of light between each pipe, either from internally generated light or from reflections from the subject.

In another illustrative embodiment, the grid assembly is located behind the proximal end of the dark field light pipe and provides diffuse light into a conical diffuser can also be illuminated by a plurality of discrete light sources. The discrete light sources are directed rearwardly and strike a reflector that returns the light toward the conical diffuser.

In another embodiment, the grid assembly is illuminated by a surrounding circuit board having mounted thereon an encircling array of side-projecting LEDs that transmit light directly, radially into the perimeter edge of the grid assembly plate. The plate can include a lens-shaped edge for improved collimation of the radially directed light.

In another embodiment, the potential problem of varying image intensity about the field of view can be addressed by providing a polygonal (square, for example) aperture to the imager lens and arranging the grid elements at a spacing and orientation that is geometrically aligned with the aperture. In this manner, the fraction of area covered by opaque dots (as viewed by the imager) is always constant versus the overall area viewed through the grid, regardless of location in the field of view. Alternatively, the aperture can be substantially coincident with the grid assembly's imager side (containing the grid thereon), and the area external of the aperture can be made opaque to reject stray reflected image light that falls outside of the aperture.

BRIEF DESCRIPTION OF THE DRAWINGS

The invention description below refers to the accompanying drawings, of which:

FIG. 13 is an a perspective view of an exemplary camera, aperture, grid plate and region of interest;

FIG. 14 is a partial plan view of an imager side of the illumination grid plate including a circular aperture as shown in FIG. 13 illustrating the cause of intensity variation about the field of view;

FIG. 15 is a partial plan view of an imager side of the illumination grid plate including a square aperture for use in the arrangement of FIG. 13 according to one embodiment; and FIG. 16 is a partial plan view of an object side of the illumination grid plate including a see-through circular aperture for use in the arrangement of FIG. 13 surrounded by an opaque field surrounding the aperture for use in the arrangement of FIG. 13 according to another embodiment.

DETAILED DESCRIPTION OF AN ILLUSTRATIVE EMBODIMENT

Figure 1:
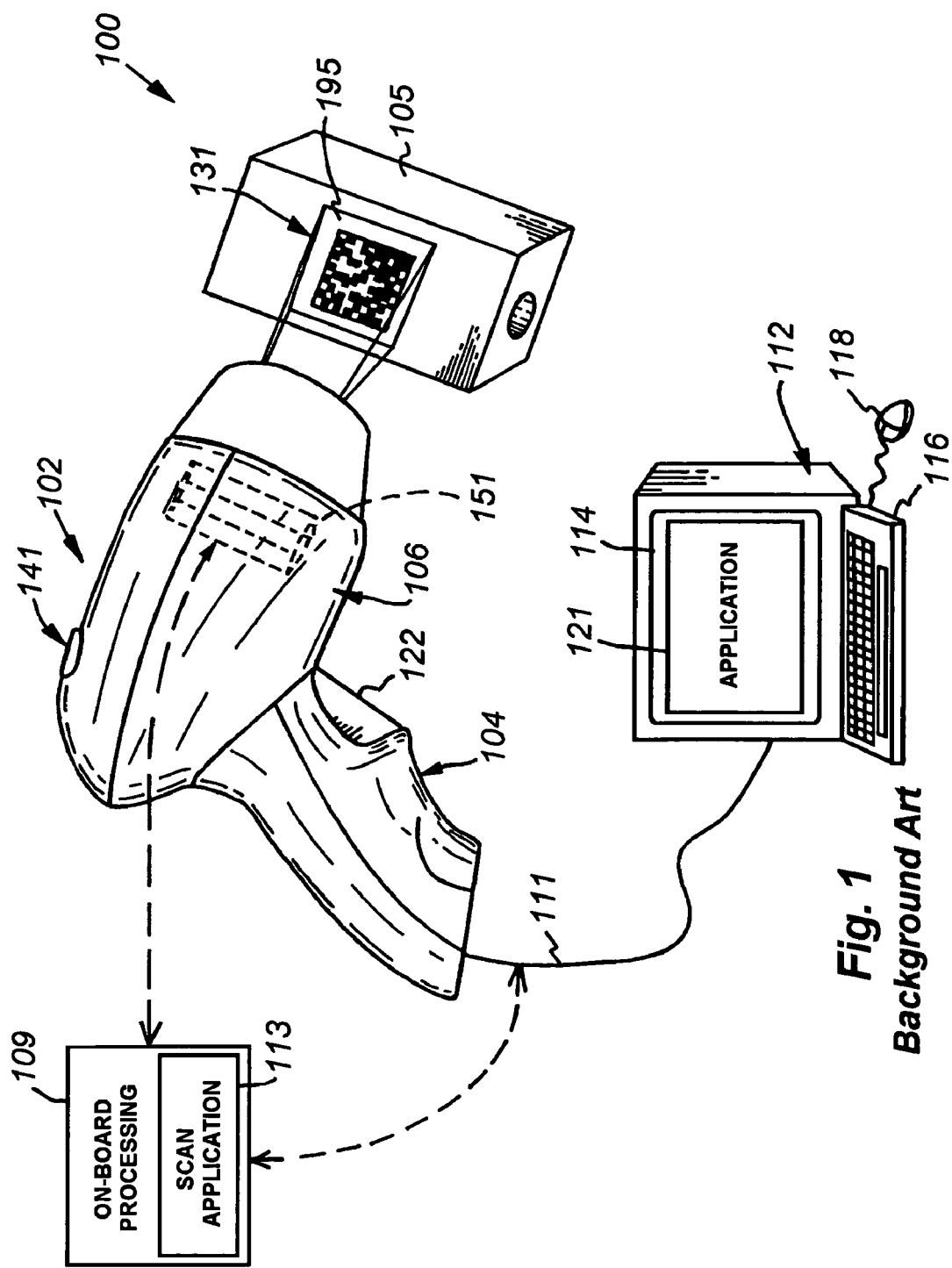
FIG. 1, already described, is a perspective view of a handheld scanning system with integrated illumination according to the prior art.
Figure 2:
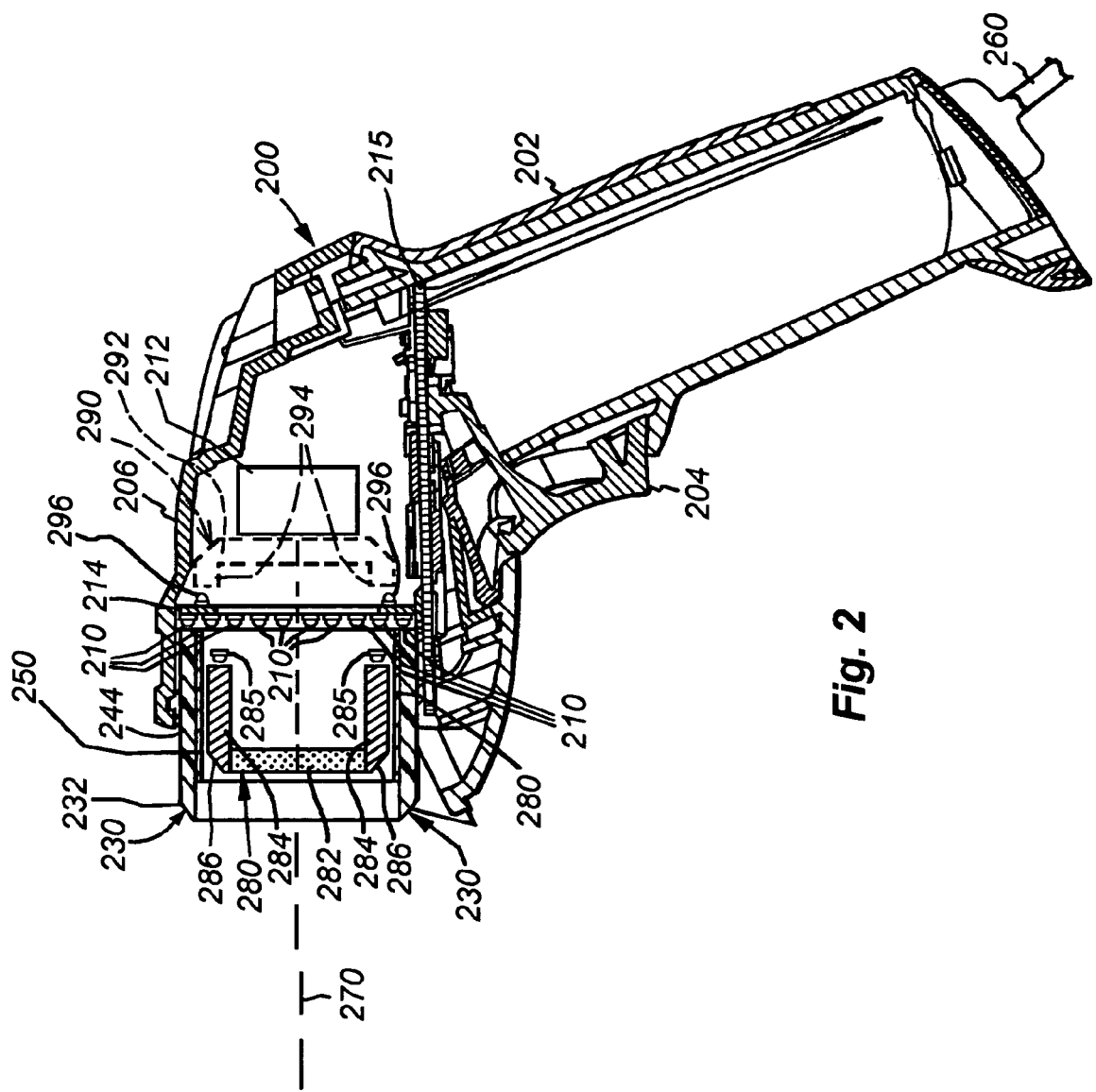
FIG. 2 is a side cross section of a handheld symbology reader that can be employed in connection with the teachings of this invention.

FIG. 2 shows a cross sectional side view of an illustrative embodiment of the reader 200 according to the present invention. The imager 212 and an illumination board 214 are positioned on a shock-resistant mounting (not shown) within the housing 206. In this exemplary embodiment, the processor module and related functional electronic components are mounted on a processor board 215. The grip portion 202 and the trigger 204 are functionally cooperative with the housing 206 and components of the processor board 215. The grip portion 202 includes a conveniently placed trigger 204 that can be actuated by a finger of the user to initiate the image acquisition and decoding function. More particularly, pressing the trigger causes each type and/or color of illumination used in the reader 200 to be projected onto the subject of interest (either in succession or simultaneously), and also causes corresponding acquisition of an image of the subject by the imager.

With further reference to the illumination assembly of the reader 200, the illumination board 214 supports a plurality of LEDs 210 that are red in this embodiment (a variety of colors and/or wavelengths (e.g. infrared) can be used). The LEDs 210 are directed forwardly, toward the distal opening of the reader. These LEDs are positioned behind a passive light pipe 244 that internally transmits light from the ring of LEDs 210 to a front end 230. In this embodiment, the front end 230 includes a chamfered surface 232. Various examples of a light pipe for use with a reader or similar application are shown and described in commonly assigned U.S. patent application Ser. No. 10/693,626, entitled LIGHT PIPE ILLUMINATION SYSTEM AND METHOD, by William H. Equitz, et al., the teachings of which are expressly incorporated herein by reference. Improvements to this light pipe are further described in commonly assigned U.S. patent application Ser. No. 11/257,411, entitled INTEGRATED ILLUMNATION ASSEMBLY FOR SYMBOLOGY READER, by Laurens W. Nunnink, et al, the teachings of which are expressly incorporated herein by reference.

Briefly explained, light passes through the extended body of the pipe 244 from the inner end, adjacent to the LEDs 210. The body is formed from a transmissive/transparent substance, such as acrylic or polycarbonate. The transmitted light is reflected internally by the angled/chamfered surface 232 of the light pipe 244 to exit at a low angle toward the center optical axis 270. The inner and/or outer wall surfaces of the light pipe 244 can be coated with opaque paint or another compound to prevent leakage of light into or out of the pipe. In this example, a shield 250 is also provided along the inner surface of the light pipe. One function of the shield 250 is to prevent transmission of diffuse light (described below) in to the light pipe. Another function is to redirect light transmitted from the reflector (see below) back into the diffuser.

In this example, the ring of LEDs 210 acts to produce a red direct bright field effect along with the dark field effect through refraction of some light from the LEDs through the chamfered surface 232. In general, at short reading distances from a surface (<25 mm between the light pipe distal (forward) end 230 and surface), the bright field illumination from the light pipe 230 tends not to interfere with the dark field illumination. The bright field illumination is available, however, for larger reading distances (>25 mm between the end 230 and the surface). This is useful for easy-to-read codes, such as black-and-white printed labels. In alternate embodiments, a separate bright field illuminator can be provided, and as described below. In fact, many available imagers include integral red bright field illuminators. In an alternate embodiment, a separate bright field illuminator can be provided in a discrete color, such as green.

A tether cord 260 provides electrical power to the reader 200, as well as a communication transmission path for the decoded character string of the encoded information, though it is contemplated that the reader 200 can be configured with battery power and wireless communication for complete portable flexibility.

The placement of the individual LEDs (or other appropriate light elements) 210 is such that the LEDs generally surround the entire perimeter of the light pipe 244. This illustrative LED placement creates a generally uniform lighting effect. The placement and number of these dark-field-illuminating light elements and other light elements described herein is highly variable. In addition, the addressing of light elements can be controlled so that only certain elements are activated at certain times to create the desired overall dark field illumination intensity and/or bias (e.g. lighter on one side than another) to the dark field illumination effect on the subject. This variable-addressing feature is described further below and is discussed in further detail in the above-incorporated U.S. patent applications and in other commonly assigned U.S. patent applications referenced therein.

Since dark field illumination is not always preferred for certain applications, the reader of this invention is provided with a diffuse illumination source. As will be described below, a plurality of arrangements for providing diffuse illumination are expressly contemplated. Two general types of arrangements described herein are shown alternatively in FIG. 2. Both arrangements of illuminators are based upon a diffuse grid assembly as described in the Background of the Invention above. They are centered about the optical axis 270 of the imager 212 and are generally free of enlarged apertures, the imager viewing the subject directly through the grid structure. The first arrangement for a grid illuminator 280 is adjacent to the chamfered or distal end 230 of the dark field light pipe 244. This illuminator is characterized by a frontal grid member 282 optically connected to a grid light pipe 284 that surrounds the perimeter of the frontal grid member. As discussed below, the grid light pipe 284 receives light from an array of forwardly directed light sources (LEDs for example) 285 having an appropriate color or wavelength (blue for example). The light sources are mounted on a circuit board that surrounds the axis 270 and that permits (via a central aperture) an image of the subject to pass into the imager 212 from the reader's distal end. The light is bent radially inward (normal to the axis 270) by a chamfered (45-degree) end 286 that internally reflected the light from the axially aligned direction. This end 286 can be coated to avoid transmission of direct bright field light through refraction.

An alternate arrangement for the diffuse illuminator (290) is shown in phantom in FIG. 2. This arrangement allows for a somewhat more-compact design in that the grid assembly 292 is located in close proximity to the imager 212 and the light pipe 294 is relatively short. It also places the grid closer to the imager 212 and further from the subject, rendering individual grid elements less visible in the acquired image. In this embodiment, the array of light sources 296 is projected rearwardly, and located on the rear side of the dark field illumination board 214. Since the illuminator required radially directed light, bending it from either a forward or rearward-projecting direction achieves the same result. As will be described below, there are a number of variations on each general arrangement described herein.

While not shown, note that a pair of aiming LEDs (typically emitting green light) can be provided. Aiming LEDs (or other light sources) assist in aligning the reader with a subject area by providing a narrow light pattern that can be centered on the subject. Where provided, these aiming LEDs should be placed ahead of the diffuse illumination grid so that the grid does not obscure their pattern. The grid placement shown in phantom (grid 292) is generally more suitable for placement of aiming LEDs as there is more space ahead of the grid. In that case, the illumination board 214 can be used to support the aiming LEDs.

The geometry of the illumination grid assembly is now discussed in further detail with reference to FIGS. 3 and 4. The grid assembly 300 consists of a plate 304 (constructed from transparent polymer or glass) having two opposing sides, including a "grid" side 302 and a "reflecting" side 306. The grid side 302 that carries a matrix of regularly spaced circular grid elements 310 surrounded by transparent spaces 320. The spaces 320 between grid elements 310 define open transparent spaces through which viewing of the object by the camera/imager can occur. The on-center spacing GCS (FIG. 4) between grid elements 310 is approximately 0.40 millimeter in this example.

The grid side 302 of the plate 304 faces the camera/imager of the arrangement. The grid elements 310 each comprise a non-reflective (optically black) upper member and a smaller-diameter, diffusively reflective (matte white) lower member 332. The white lower member 332 has a radius of approximately 0.10 millimeter in this example, while the black upper member has a larger radius of approximately 0.14 millimeter. This creates a dark ring around each white reflective (lower) member 332 as viewed from the object side as shown in FIG. 4. The white lower member 332 can be applied to the grid side 302 by lithographic, deposition or other techniques. The larger diameter black upper member 330 can then be overlaid on top of the white lower member by similar techniques. The resulting grid element 310, combining upper and lower members provides a substantially flat object-facing surface 334 against the grid side 302 of the plate as shown. When viewed from the camera side of the plate 304 the elements 310 appear a uniform optical black to reduce unwanted reflections from the white portions of each element into the imager. Hence only image light passing from the object side, through space 320 between grid elements is viewed by the imager.

Illumination is provided around the periphery of the plate 304 using a plurality of light sources (LEDs) 340 arranged in a continuous array. In a conventional grid arrangement, according to the Background, these light sources 340 are contained in an optically opaque, peripheral framework 350 in the conventional. In the illustrative embodiments herein, alternative mounting arrangements are used, as noted in FIG. 2 and as further described below. The framework 350 in this example also holds the plate 304 in place. To effect diffuse illumination, the reflecting side 306 is spaced from the grid side at a spacing that provides a plate thickness TLG of approximately 4.8 millimeters. The spacing of the grid side 302 and reflecting side produces internal reflection of illumination from the light sources 340 as illustrated by the reflecting rays 370 bouncing between the grid side 302 and the reflecting side 306. These internally reflected rays 370 also strike the white centers of each grid element 310 and are refracted into downwardly directed rays 380 that define a high enough angle to overcome internal reflection by the reflecting side. As such the rays 380 pass through the reflecting side 306, and strike the object as highly diffuse illumination. Note that the surrounding 0.04-millimeter annulus of black (of each upper member 330) prevents rays near the edge of each grid element 310 from creating light bounce that would travel back through the space 320 between grid elements, and thereby blind the camera. Hence the radially directed light of the light source array is translated almost exclusively into direct diffuse illumination (380) covering the subject widely and evenly.

Having described the general characteristics of a diffuse illumination grid using radially directed light, some illustrative arrangements of a grid illuminator installed in a handheld symbology reader are now described with reference to FIGS. 5-8. As noted above, a framework (350 in FIG. 3) holding a set of radially projecting light sources would typically occupy significant portion of the reader's interior surface area (the area radially within the dark field light pipe, for example), thereby reducing the area available to project diffuse illumination. Thus, each of the embodiments described includes a technique for redirecting the illumination radially from a set of axially oriented and axially projecting light sources. In alternate embodiments, it is expressly contemplated that a set of radially projecting light sources can be employed using appropriate mounting arrangements within the reader.

Before describing each of the illustrative embodiments for a reader having combined dark field and direct diffuse illumination, it should be noted that any embodiment of a handheld reader contemplated herein can be implemented with only diffuse illumination employing an illumination grid assembly in accordance with this invention. Such readers retain many of the advantages of those with a combined direct diffuse and dark field illumination assembly—particularly the ability to provide an even diffuse light pattern across the entire surface of the subject. A diffuse-only reader may be preferred where the subject of interest is best viewed using direct diffuse light and size and weight limitations make the omission of the dark field light pipe advantageous.

Figure 5:
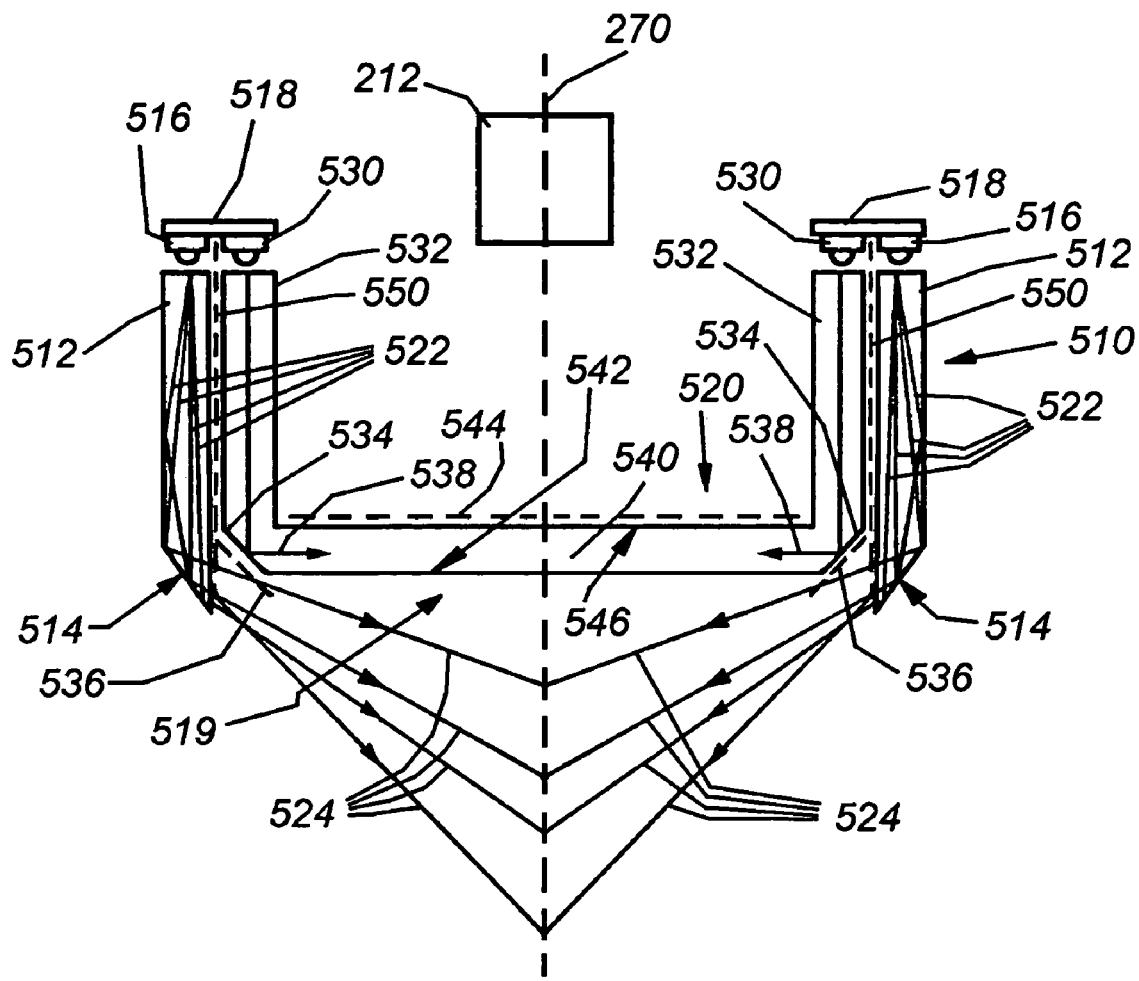
FIG. 5 is a somewhat schematic side cross section of a reader imager, dark field illumination light pipe and diffuse illuminator employing a grid assembly in accordance with FIG. 2 arranged adjacent to the distal end of the dark field light pipe according to an illustrative embodiment.

FIG. 5 shows one illustrative embodiment of the reader's illumination assembly 510 combining a dark field light pipe 512, having a chamfered distal end 514 with a diffuse illumination grid assembly 520 that is nested within the dark field light pipe. The dark field light pipe 512 receives light from an array of axially directed light sources (LEDs for example) 516 mounted on an illumination circuit board 518. This board encircles the central opening 519 defined by the dark field light pipe 512, allowing for a large central aperture in which the imager 212 may acquire images from the subject. As shown, the chamfered edge 514 defines an angle of approximately 35 degrees with respect to the axial direction (axis 270). This angle causes rays 522 projected from the dark field light sources 516 to be internally reflected into the low angle dark field rays 524 that project inwardly toward the central optical axis 270.

The illumination board 518 also supports a second array of light sources 530 that is radially inward of the first array of sources 516, and also forwardly projecting into a diffuse illuminator light pipe 532. This is an advantage in that only a single board is needed, potentially reducing cost and complexity. The diffuse illuminator light pipe 532 is a cup having a predetermined frontal cross section shape (round, oval, rectangular or a combination of shapes) that conforms generally to the inside dimension of the dark field light pipe. It can be molded from polymer, such as transparent acrylic or polycarbonate. In this embodiment, it includes a 45-degree front edge 534 that can be coated (dashed line 536) or shielded to eliminate refraction through the edge. This edge chamfered 534 thereby causes all light from the sources 530 to be bent radially inward, as shown by the rays 538. The light pipe includes a unitary front plate 540 that extends inwardly from the edge 534 to cover the front of the opening 519. The front plate 540 is transparent and transmitted from the edge 534 is internally reflected between the front face 542 of the front plate 540 and the rear face 546. It can be constructed as a unitary member by injection molding or other appropriate techniques. As described above some light striking the rear face 546 encounters the grid 544 of discrete reflective spots each having a structure described above (reflective/white centers with non-reflective/black edges). The grid 544 is deposited on the rear face 546 of the front plate 540 in a manner described above—for example by printing or deposition techniques. In this location, light passes through the rear face into each grid element where it is refracted at an angle that allows it to pass forwardly through the front face 542 as highly diffuse light. Note that a shield (dashed line 550) is provided between the inner wall of the dark field light pipe 512 and the outer wall of the diffuse illuminator light pipe 532. The shield extends up to the two arrays of light sources 516 and 530 to maintain optical separation between each array. This shield 550 generally prevents transmission of reflected or transmitted light from one pipe to the other.

Figure 6:
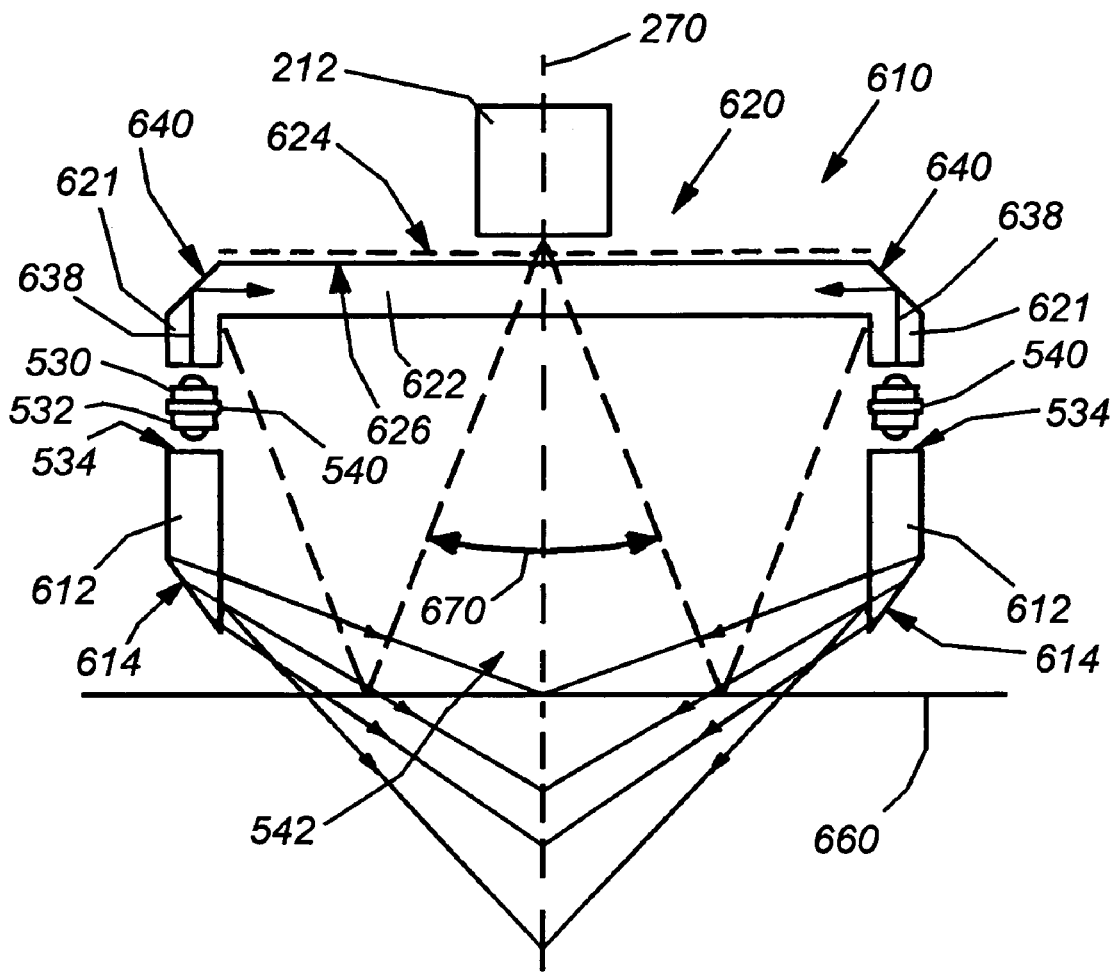
FIG. 6 is a somewhat schematic side cross section of a reader imager, dark field illumination light pipe and diffuse illuminator employing a grid assembly in accordance with FIG. 2 arranged rearward of the proximal end of the dark field light pipe according to another illustrative embodiment.
Figure 7:
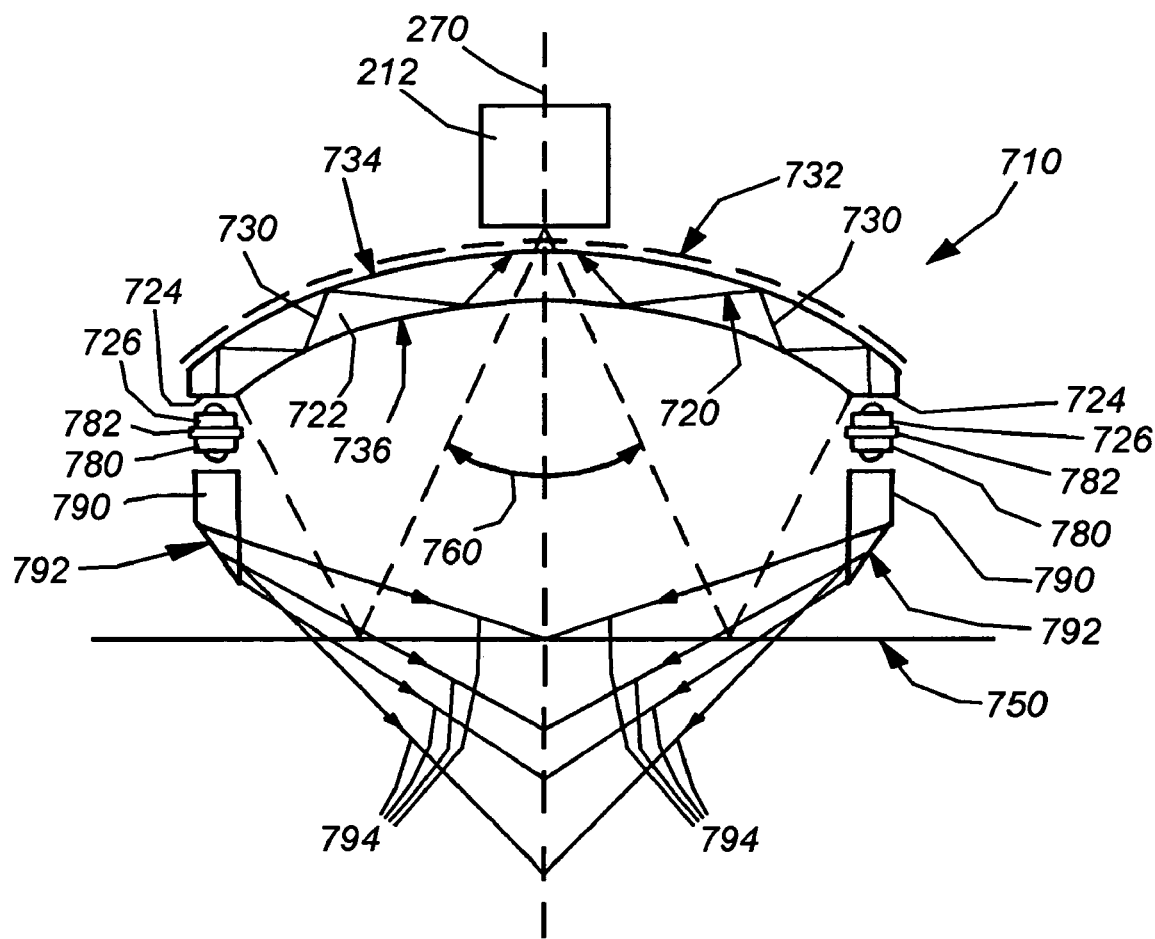
FIG. 7 is a somewhat schematic side cross section of a reader imager, dark field illumination light pipe and diffuse illuminator employing a grid assembly in accordance with FIG. 2 arranged rearward of the proximal end of the dark field light pipe and defining a curved shape according to another illustrative embodiment.

FIG. 6 details another illustrative embodiment of an illumination assembly 610 including a shortened dark field light pipe 612 with chamfered distal edge 614 and a rear-mounted diffuse illumination grid assembly 620. The grid assembly 620 features a shortened/widened light pipe 621 and a unitary front plate 622. As described above, the front plate 622 includes a formation of grid elements 624 applied to its rear face 626. As also noted above (referring to FIG. 2), by mounting the front plate 622 and grid elements 624 in close proximity to the imager, and further from the subject, the individual grid elements 624 are less visible in the acquired image of the subject. In this embodiment, the overall radial width of the grid assembly 620 is increased as because the array of light sources 530 of the grid assembly are located to project axially rearward (rays 638), directly behind the forwardly projecting array of light sources 532, which are aligned with the proximal end 534 of the dark field light pipe 612. The rays are directed radially using a chamfered, reflecting edge 640 as described above. The two arrays of light sources 530, 532 are provided to opposite sides of the same illumination circuit board 540, thereby allowing for a narrow circuit board ring around the inner opening 542 of the reader. This maximizes the degree of diffuse illumination projected from the grid assembly 620.

Note, if the subject is highly specular, the distance of the grid from the object surface (exemplary surface 660) causes the grid light to appear smaller in the background than in the arrangement of FIG. 5. This property is illustrated by the viewing angle 670 reflected off the exemplary surface 660. The illumination assembly embodiment 710 of FIG. 7 improves upon the limitations in viewing angle (670) in the embodiment of FIG. 6 by providing a curved illumination grid assembly 720. The assembly consists of a trans-parent curved front plate 722 that can define a parabolic, spherical or another curving shape that is generally symmetrical about the imager's optical axis 270. The front plate 720 has a flat front edge that faces rearward-projecting light sources 726 in an array about the perimeter of the plate 722. In this arrangement, the curvature of the plate 722 guides internally reflected light (rays 730) from the axial direction along the perimeter to a radially directed convergence at the axis 270. The grid elements 732 are applied over the convex rear face 734 of the front plate 722. Light passing through the rear face 734 bounces off of the grid elements and is directed at a spread of angles back through the front face 736 of the plate 722 as highly diffuse light. Where the surface is highly specular (exemplary surface 750), the curved grid assembly 710 defines a larger reflected viewing angle 760 that the angle 670 attained with the flat grid assembly 620 of the illumination assembly embodiment 610 shown in FIG. 6. The grid assembly light sources 726 are arranged to project rearwardly and are aligned with forwardly projecting dark field light sources 780, mounted on opposite sides of a narrow (in the radial direction) illumination circuit board 782. A relatively short dark field light pipe 790 with a distal chamfered edge 792 is provided. This light pipe 790 generates desired dark field illumination (rays 794).

As discussed in the Background of the Invention above, a symbology reader having a conical diffuser is shown and described in the above-incorporated U.S. patent application entitled INTEGRATED ILLUMINATION ASSEMBLY FOR SYMBOLOGY READER, and related applications referenced therein. The conical diffuser is a translucent, diffusive surface that tapers outwardly from the region of the imager toward the distal end. By appropriately directing light sources the entire diffuser surface can be lighted to some degree, allowing it to project a continuous spread of diffuse light that increases the useful viewing angle. However, as noted above, the conical diffuser defines an open region without forwardly directed illumination in the region of the imager lens and aiming LEDs (220 in FIG. 2). This open region about the axis 270 of the reader can generate a darkened center spot on the subject.

Figure 8:
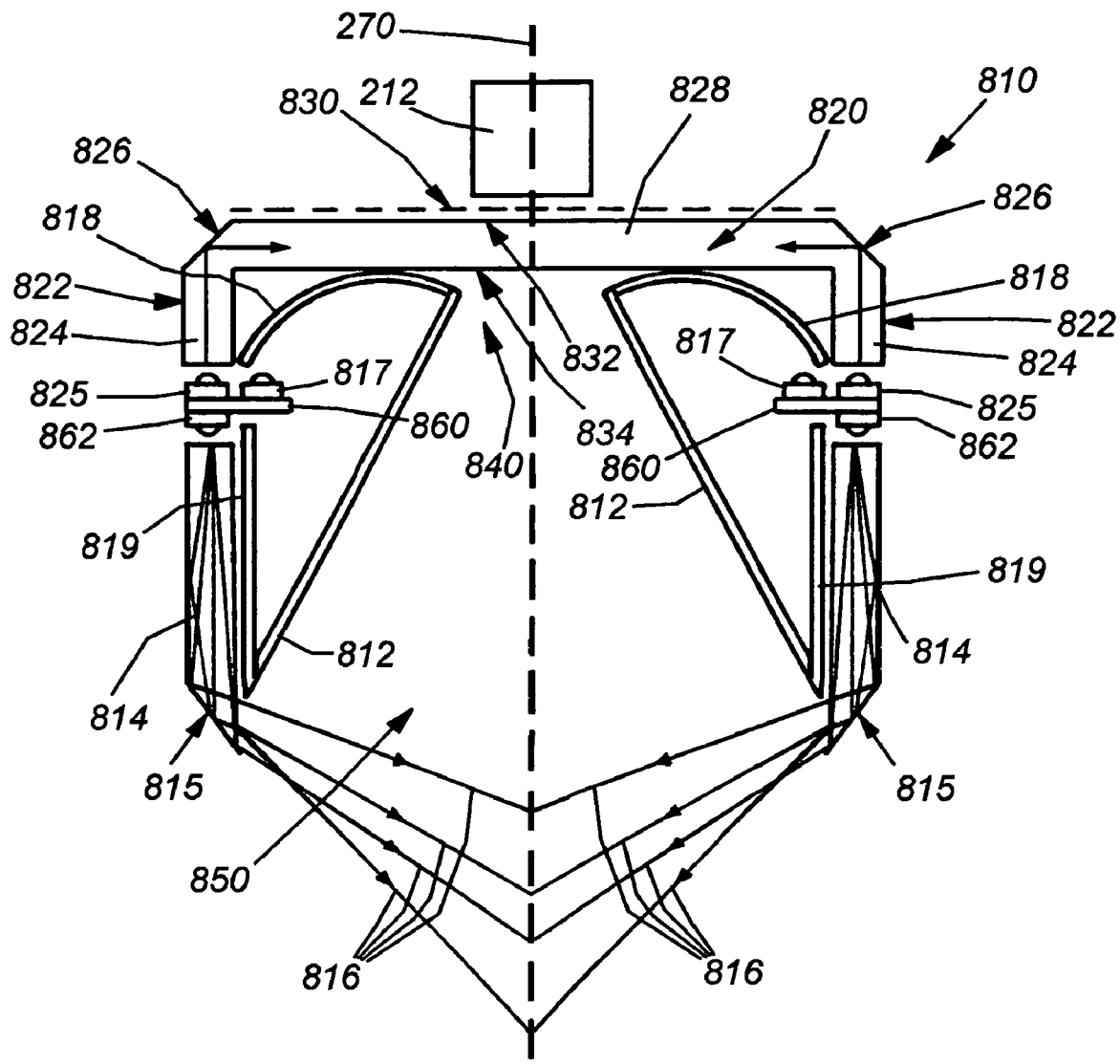
FIG. 8 is a somewhat schematic side cross section of a reader imager, dark field illumination light pipe, diffuse illuminator employing a grid assembly in accordance with FIG. 2 arranged rearward of the proximal end of the dark field light pipe and conical diffuser with discrete illumination sources according to another illustrative embodiment.

Referring to FIG. 8, an illumination assembly 810 with a conical diffuser 812 is shown. Note that the term "conical diffuser," is taken to include tapered shapes that may include corners and/or flattened sides as well as round cones. The conical diffuser 812 is nested within the interior space of the dark field light pipe 814. The dark field light pipe 814 includes the above-described chamfered distal end 815 generating dark field light (rays 816). The diffuser is illuminated by a set of rearwardly projecting light sources 817 that direct light into a rear reflector 818 having a variety of parabolic, stepped or other shapes that are adapted to direct the light along the full length of the inner side of the diffuser 812. Novel reflector shapes and conical diffuser geometries are described in the above-referenced U.S. patent application entitled INTEGRATED ILLUMINATION ASSEMBLY FOR SYMBOLOGY READER, and related applications referenced therein. The reflector includes a matte white reflecting surface with texturing in an illustrative embodiment for creating a further diffusive effect. The diffuser 812 is optically isolated from the dark field light pipe 814 by a shield 819 having an opaque, non-transmissive surface coating.

The illumination assembly also includes a diffuse illumination grid assembly 820 positioned between the reflector 818 and the imager 212. This grid assembly 820 consists of a light pipe 822 having an axially directed forward section 824 that carries internally reflected light from rearwardly projecting light sources 825 into a 45-degree chambered edge 826 and then into a radially directed front plate 828. As in the above-described embodiments, the front plate 828 is transparent, allowing images of a subject to be viewed by the imager 212 therethrough. A series of grid elements 830, having a construction as described generally herein, is applied to the rear face 832 (imager side) of the front plate 828. Light internally reflected along the front plate 828 is bounced off the grid elements 830 on the rear face 832, and then forwardly through the front face 834 of the front plate 828 as highly diffuse illumination.

Notably, the arrangement of FIG. 8 places a continuous diffuse light source through which the imager 212 can "see" in the aperture 840 of the conical diffuser affording full coverage with direct diffuse light within the entire area of the reader opening 850. In an embodiment of the invention, the reflector can be constructed from a material and/or with a coating that allows light to pass from the grid illumination assembly 820 into the conical diffuser 812 so that additional, highly diffuse grid light can be applied to the diffuser 812. Moreover, the area of the grid can vary so long as the aperture 840 is properly covered by the grid assembly 820.

To save space and reduce the number of components, a single illumination circuit board 860 supports both the diffuser light sources 817 and grid light sources 825. Likewise, the dark field light sources 862 are provided opposite the grid light sources 825 on the same board 860. The shield 819 extends sufficiently rearwardly to block migration of light from the dark field light sources 862 into the conical diffuser 812. This prevents transmission of reflected light and also ensures that, where different color/wavelength light is used for different illumination types and/or where different types of light are toggled at different times, the light from one illuminator does not pass through another illuminator. Note that the diffuser light sources 817 are located radially inboard from the light pipe sources 825 and 862. In practice, the diffuser light sources 817 may be fewer in number (four, for example) than the encircling arrays of light sources employed for each light pipe.

While not shown, the conical diffuser 812 can include an overlying filter, tint or coating to block reflected light from, for example, the dark field illuminator so that it is not retransmitted as diffuse light through the conical diffuser. Where a different color is used for each type of illumination, the filter can be tuned to block the color used in dark field illumination while allowing diffuse illumination color to pass. A description a handheld symbology reader that employs different wavelength/colors of illumination to resolve diffuse versus dark field is provided in commonly assigned U.S. patent application Ser. No. 11/257,410, entitled SYSTEM AND METHOD FOR EMPLOYING COLOR ILLUMINATION AND COLOR FILTRATION IN A SYMBOLOGY READER, by Laurens W. Nunnink, the teachings of which are expressly incorporated herein by reference. Note that the grid assembly 820 should typically remain unfiltered so that dark field light can pass through the aperture 840 and reach the imager when called for.

Figure 4:
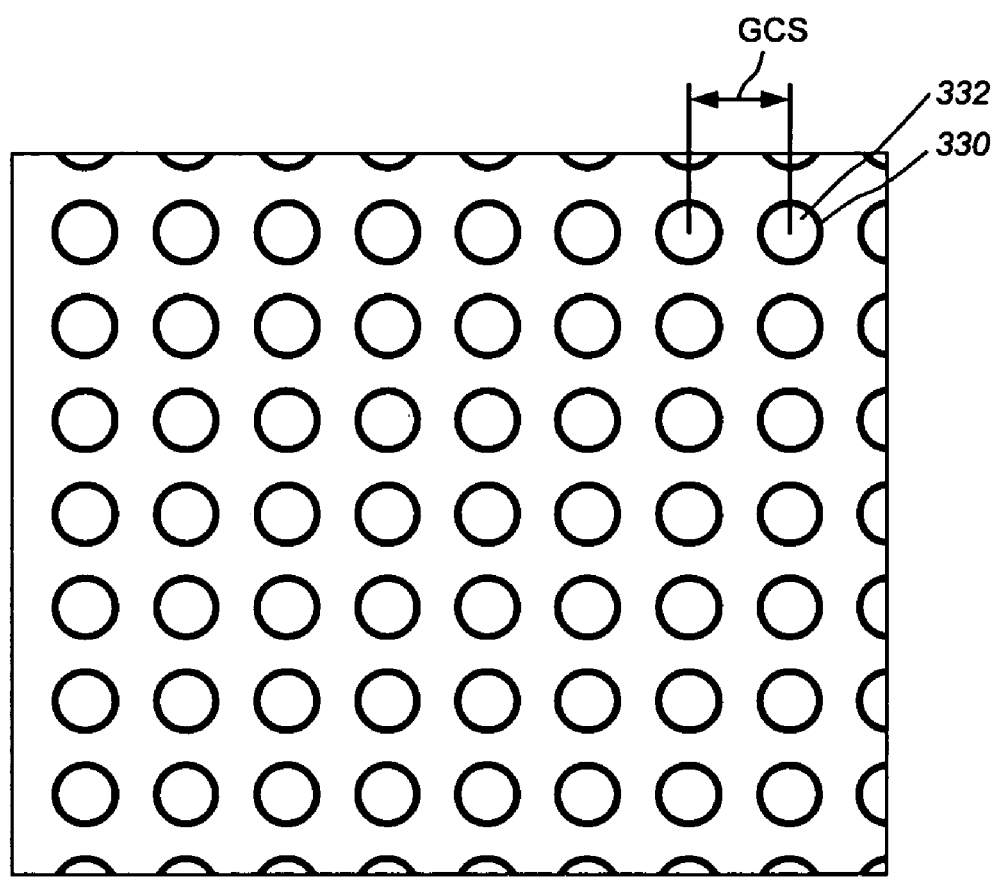
FIG. 4 is a plan view on an enlarged segment of an overall diffuse illumination pattern produced on a subject using a grid assembly in accordance with FIG. 3.

The illustrative grid elements arranged on the plate in a generally rectangular or square packing arrangement (see FIG. 4). It is expressly contemplated that the organization of grid elements can be based upon another tessellated shape, such as a hexagon or triangle, or upon a geometrically varying or random packing order. Likewise, the size of grid elements and their relative spacing is highly variable. A smaller grid element would tend to be less visible in then image and may be appropriate for certain viewing distances. Similarly, the outline shape of each grid element is highly variable. While circular grid elements are described, the outline shape can be a regular or irregular polygonal (hexagonal, for example) or another curved shape (elliptical, for example).

Figure 3:
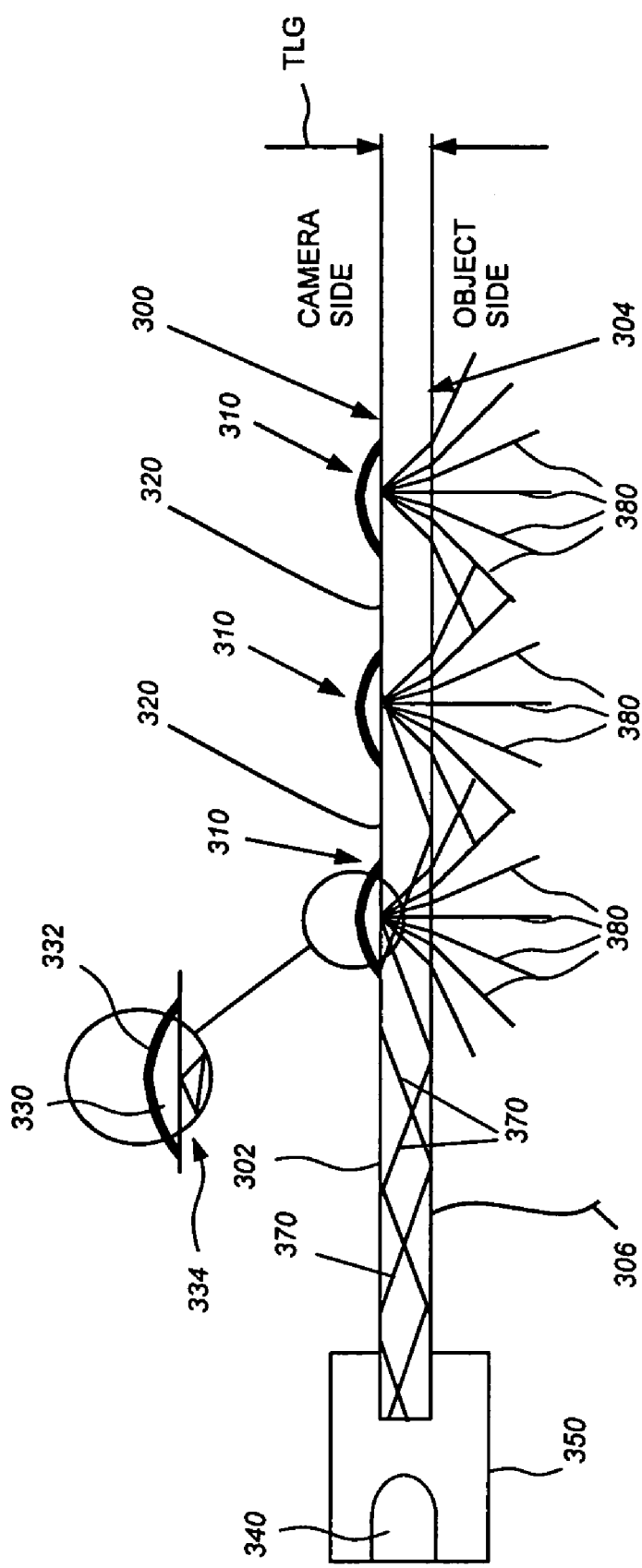
FIG. 3 is a somewhat schematic side cross section of a diffuse illumination grid assembly for use in connection with the handheld symbology reader of FIG. 2.
Figure 9:
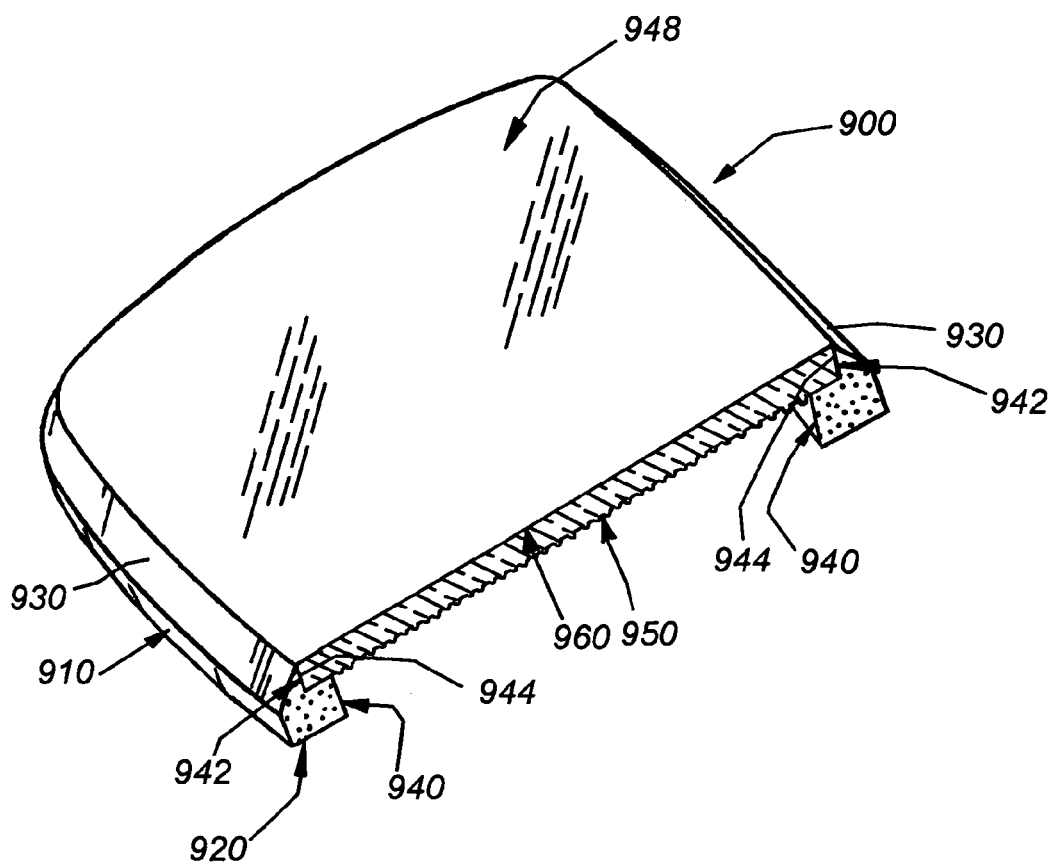
FIG. 9 is a cross-sectional perspective view of diffuse illumination assembly employing a light pipe that supports a separate grid assembly formed on a transparent plate according to an alternate embodiment.

Additionally, while the diffuse illumination grid assemblies described above employ a unitary front plate that is molded as part of a light pipe, it is expressly contemplated that a structure similar to that of FIG. 3 can be provided. FIG. 9 details such a grid assembly structure. This grid illumination assembly 900, shown in cross sectional perspective view, defines the modified rectangular perimeter outline described in the above-incorporated U.S. patent application entitled INTEGRATED ILLUMINATION ASSEMBLY FOR SYMBOLOGY READER, and employed herein according to an illustrative embodiment of the reader 200. The assembly 900 consists of a surrounding light pipe 910 with a light-input edge 920 oriented axially and a chamfered 45-degree edge 930 that internally reflects the light radially inward. The inner edge 940 of the light pipe includes a notch area 942 that supports a separate transparent front plate 948, around its perimeter. The front plate 948 consists of a (imager-side) grid face 950 having the grid elements applied thereto and an opposing (subject-side) reflecting face 960 that generates desired internal reflection and bounce of light off the elements toward the subject. The notch is particularly arranged to allow light to pass from the inner face of the notch 942 into the confronting side edge 944 of the front plate 948. The inside edge 940 of the light pipe 910, in regions remote from the notch 942 can be coated or shielded so that light is contained within the pipe and does not migrate into or out of it at these locations.

Figure 10:
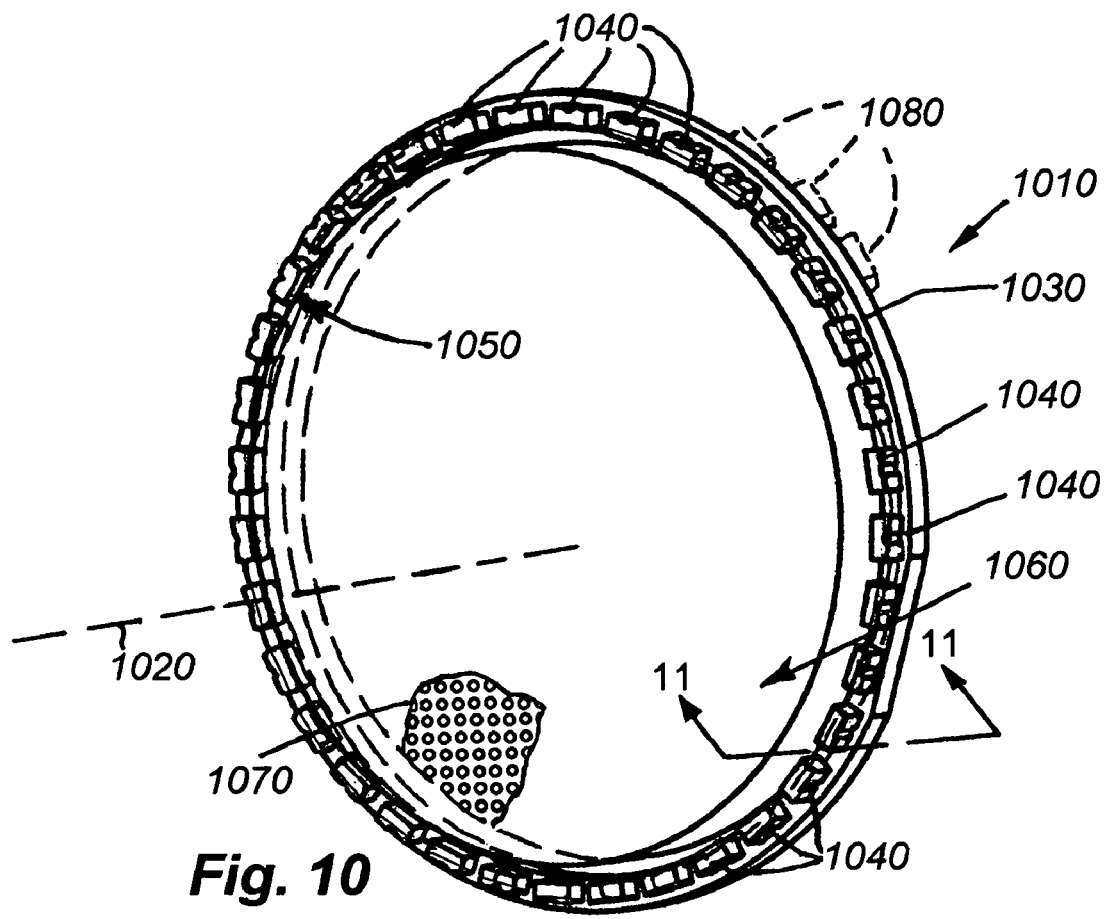
FIG. 10 is a perspective view of a diffuse illuminator employing a grid assembly, having side-projecting light sources according to an alternate embodiment.

In each of the above embodiments, an axially oriented light pipe is used to receive light from an array of light sources and redirect the light radially into a separate or unitary front grid illumination plate. Such a light pipe enables a smaller profile and a more-conventional mounting of axially-directed LEDs on a circuit board. FIG. 10 details an alternate embodiment of a grid illumination assembly 1010, which employs a conventionally oriented (extending on a plane normal to the optical axis 1020) circuit board 1030 to support a set of conventional side-projecting LEDs 1040 that direct light radially inward toward the perimeter edge 1050 of an illumination grid plate 1060 having a layout of grid elements 1070 (shown partially) as described generally herein. The circuit board 1030 can support dark field LEDs 1080 (shown in phantom) on, for example, the opposing side of the board or on the same side of the board within an outer or inner perimeter ring (not shown). The actual perimeter shape of the ring is highly variable. It is shown as a circular shape herein for simplicity. However, the modified rectangle shape as described above (FIG. 9) can be employed, among other shapes.

Figure 11:
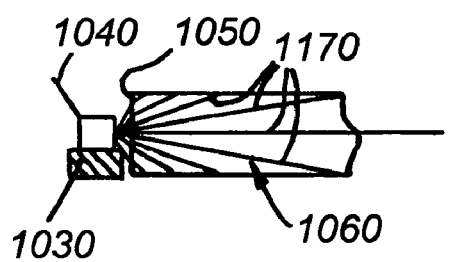
FIG. 11 is a partial side cross section of the illumination circuit board, an exemplary side-projecting LED and a portion of the grid illumination plate taken along line 11-11 of FIG. 10
Figure 12:
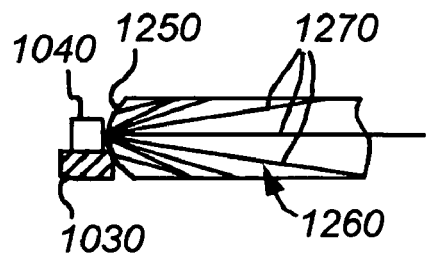
FIG. 12 partial side cross section based upon the cross section of FIG. 11 wherein the grid illumination plate includes a convex edge for better light collimation therein according to an alternate embodiment.

The illumination grid plate edge 1050 can be a straight cylinder, coaxial with the axis 1020 as shown in FIG. 11. The transmitted rays 1170 project from the relatively narrow point region of each LED 1040 through the edge and into the plate 1060 as shown. A lens structure (not shown) can be provided between the array of LEDs 1040 and the edge 1050 to improve collimation of the rays in alternate embodiments. Conversely, as shown in FIG. 12, the perimeter edge 1250 of a modified grid plate 1260 can be formed with a convex or other lensmatic shape that improves collimation of the rays 1270 for better internal reflection.

Another possible improvement to the grid plate structure, for use in any of the above embodiments is shown with reference to FIGS. 13-16. By way of illustration, FIG. 13 details a generalized arrangement 1300 for an imager lens 1310 with an associated aperture 1312. The lens is located at a specified standoff distance DO from a given point 1320 on an object surface 1322, located within a specified field of view (perimeter edge 1324). The light 1330 from the point 1320 is reflected back to the aperture 1312, passing through the illumination grid plate 1340. The grid surface 1342 (imager side) is located at a specified distance DG from the aperture 1312. The relative distances DO and DG, along with the size/shape of the aperture 1312 and location of the point 1320 on the field of view dictate the size of an area 1350 through which the light 1330 passes. All other factors remaining equal, the size of the area 1350 on the grid plate 1340 will vary for different points within the field of view 1324. This is because the distance between a point 1320 relative to the aperture will vary as a function of the angle of light with respect to the optical axis 1380.

Because the size of the area 1350 varies across the field of view, the number of grid elements encompassed by the area 1350 will vary. This is illustrated in FIG. 14, in which the circular aperture generates an area 1350 that partially crosses a number of grid elements (shown on the imager side of a grid 1410) to varying degrees. If the circle is slightly larger or slightly smaller a fraction of the area covered by black dots (grid elements) will vary non-linearly relative to the circle area. This non-linearity can lead to intensity fluctuations across the image that may affect the reader's decoding algorithms.

Accordingly, one solution is to provide the lens 1310 with a square aperture to generate the square area 1550 on the grid 1410 shown in FIG. 15. In this embodiment, the grid array is oriented in a square arrangement that is aligned with the square aperture shape. The spacing 1560 between grid elements is also set so that the square area 1550 is equal to a multiple of the grid spacing size so that the fraction of the overall area 1550 covered by dots at any point in the field of view is constant. In this manner, the relative intensity of reflected light received from any point on the field of view is unaltered by the grid. It is contemplated that other polygons and associated grid element layouts may be used to achieve similar intensity-regulating results.

An alternate solution to the problem of intensity variation is to position the lens so that the aperture (circular in this example) is coincident with the imager side of the grid (the side containing the grid elements applied thereto). As shown in FIG. 16, the grid plate 1610 object side is provided with a central opening having typical grid elements 1620 and transparent space therebetween. This region corresponds with the imager aperture (with grid elements that are, in actuality, many times more numerous and smaller that those shown). Optionally, the area outside of the aperture region is coated with opaque paint (black) in this embodiment so that only object-reflected light in the region of the aperture is transmitted through the grid plate, while the surrounding grid elements 1622 reflect diffuse illumination toward the object in a normal manner.

It should be clear from the above-described embodiments, that a reader having superior illumination and mark-reading capabilities is described herein. This reader alleviates many of the disadvantages encountered with prior art readers, and provides improved object-illumination.

The foregoing has been a detailed description of illustrative embodiments of the invention. Various modifications and additions can be made without departing from the spirit and scope thereof. For example, any of the various features described herein can be combined with some or all of the other features described herein according to alternate embodiments. For example, the terms forward, rearward, distal, proximal, radial and axial are each conventions used to describe a particular embodiment of the invention. It is expressly contemplated that the relative orientations described herein can be defined in view of other terms. Further, the size and scale of various components described herein is highly variable and the illustrative embodiments should be taken as one example of scale and size. It is also expressly contemplated that any of the processes or steps described herein can be implemented as hardware, software, including program instructions executing on a computer, or a combination of hardware and software. Accordingly, this description is meant to be taken only by way of example, and not to otherwise limit the scope of this invention.

What is claimed is:

1. A handheld symbology reader having a reader imager that acquires images of subjects comprising:
   a housing constructed and arranged to be held by and operated by a hand;
   a first light source array constructed and arranged to direct light in a radial direction inward toward and approximately normal to an optical axis of the reader imager; the array including a first light pipe having an axial portion that receives light projecting in an axial direction approximately parallel with the optical axis and a bevel edge that internally reflects the light into the radial direction;
   an illumination grid assembly including a transparent plate having an imager-facing side and a subject-facing side, the imager-facing side including, applied thereon, a plurality of grid elements with transparent spaces therebetween, each of the grid elements including a surface with a reflective center and a non-reflective edge facing toward the subject and a non-reflective surface facing toward the reader image; and
   wherein the transparent plate is constructed and arranged to internally reflect light in the radial direction and cause light from the array to reflect from the reflective center of each grid element and exit through the subject-facing side toward the subject as highly diffuse light while image light is returned to the imager from the subject through the transparent spaces.

2. The handheld symbology reader as set forth in claim 1 wherein the transparent plate is operatively and unitarily connected to the axial portion and the bevel edge of the first light pipe.

3. The handheld symbology reader as set forth in claim 1 further comprising a second light pipe having a edge at a distal end that generates dark field light, the chamfered edge being located axially remote from and external of the first light pipe.

4. The handheld symbology reader as set forth in claim 3 wherein the second light pipe defines an interior opening and wherein the illumination grid assembly is constructed and arranged to project the highly diffuse light through the interior opening.

5. The handheld symbology reader as set forth in claim 4 further comprising a second light source array arranged to project light to the second light pipe, the first light source array being remote from the second light source array.

6. The handheld symbology reader as set forth in claim 5 wherein the first light source array projects light in a first direction and the second light source projects light in a second direction opposite the first direction.

7. The handheld symbology reader as set forth in claim 6 wherein the first light pipe is located between a proximal end of the second light pipe and the reader imager.

8. The handheld symbology reader as set forth in claim 7 further comprising a reflector that receives light from a third array of light sources and a conical diffuser nested within the interior opening of the second light pipe tapering from a widened opening adjacent to the distal end of the second light pipe to a narrowed aperture adjacent to the illumination grid assembly, the illumination grid assembly spanning the aperture and the reflector projecting light into the conical diffuser.

9. The handheld symbology reader as set forth in claim 5 wherein each of the first light source array and the second light source array project light in a first direction.

10. The handheld symbology reader as set forth in claim 9 wherein the first light source array is located radially inward of the second light source and the light pipe is nested within the interior opening of the second light pipe adjacent to side walls of the second light pipe.

11. The handheld symbology reader as set forth in claim 5 wherein each of the first light source array and the second light source array are located together on an illumination circuit board.

12. The handheld symbology reader as set forth in claim 5 wherein the first light source array projects light having a first wavelength and the second light source array projects light having a second wavelength, different than the first wavelength.

13. The handheld symbology reader as set forth in claim 12 wherein each wavelength defines a discrete visible color.

14. The handheld symbology reader as set forth in claim 1 wherein the light pipe includes an inner edge adapted to retain the transparent plate, the transparent plate being a separate non-unitary component relative to the light pipe, inner edge and a confronting perimeter edge of the transparent plate being constructed and arranged to transmit light therebetween.

15. The handheld symbology reader as set forth in claim 1 wherein each grid element defines a circular outline shape.

16. The handheld symbology reader as set forth in claim 1 wherein the first light source array comprises a plurality of side-projecting LEDs mounted on a circuit board, the transparent plate including a perimeter edge facing the array and receiving transmitted light therefrom.

17. The handheld symbology reader as set forth in claim 16 wherein the perimeter edge includes a lens shape for collimating the light from the array.

18. The handheld symbology reader as set forth in claim 1 wherein the reader imager includes a lens having an aperture defining a polygonal aperture shape and wherein the grid elements are spaced from each other in accordance with an arrangement that is substantially aligned with respect to the polygonal aperture shape.

19. The handheld symbology reader as set forth in claim 18 wherein the polygonal aperture shape comprises a square shape.

20. The handheld symbology reader as set forth in claim 19 wherein the reader imager includes a lens having an aperture and wherein the imager side of the transparent plate is located coincident with the aperture.

21. The handheld symbology reader as set forth in claim 20 wherein the imager side of the transparent plate includes, in the transparent spaces external of the aperture an opaque coating.

22. A method for reading symbology on a subject with a handheld reader comprising the steps of:
 aiming a distal end of a housing having a hand grip at the subject at a predetermined working distance;
 diffusely illuminating the subject with a diffuse light provided by a diffuse illumination grid assembly within the housing, the grid assembly receiving light from a first array of light sources around a perimeter thereof and internally reflecting the light between a subject-facing face and an imager-facing face of a transparent plate, the internally reflected light striking grid elements on the imager-facing side, each of the grid elements having a reflective center and a non-reflective edge and transparent spaces between the grid elements, wherein the internally reflected light is emitted from the grid elements, through the subject-facing face and toward the subject as highly diffuse light;
 illuminating the subject at a predetermined time using a light pipe that receives light from a second array of light sources and that internally reflects the light into an end that produces dark field illumination; and
 acquiring an image of the subject from the highly diffuse light reflected from the subject through the transparent spaces based upon the reflection of the highly diffuse light off the subject.

23. The method as set forth in claim 22 wherein the step of diffusely illuminating includes projecting light through a conical diffuser nested within the light pipe and having a aperture aligned with an imager and which is spanned by a portion of the grid assembly.

24. The method as set forth in claim 22 further comprising providing a diffuse illuminator light pipe that bends light from the first array of light sources from an axial orientation into a radially inward direction into the transparent plate.

25. The method as set forth in claim 22 wherein the step of diffusely illuminating includes projecting light from a plurality of side-projecting LEDs located adjacent to a perimeter edge of the transparent plate.

26. A handheld symbology reader having a reader imager that acquires images of subjects comprising:
 a housing constructed and arranged to be held by and operated by a hand;
 a first light source array constructed and arranged to direct light in a radial direction inward toward and approximately normal to an optical axis of the reader imager;
 an illumination grid assembly including a transparent plate having an imager-facing side and a subject-facing side, the imager-facing side including, applied thereon, a plurality of grid elements with transparent spaces therebetween, each of the grid elements including a surface with a reflective center and a non-reflective edge facing toward the subject and a non-reflective surface facing toward the reader image;

a lens having an aperture defining a polygonal aperture shape and where the grid elements are spaced from each other in accordance with an arrangement that is substantially aligned with respect to the polygonal aperture shape; and wherein the transparent plate is constructed and arranged to internally reflect light in the radial direction and cause light from the array to reflect from the reflective center of each grid element and exit through the subject-facing side toward the subject as highly diffuse light while image light is returned to the imager from the subject through the transparent spaces.

27. The handheld symbology reader as set forth in claim 26 wherein the polygonal aperture shape comprises a square shape.

28. The handheld symbology reader as set forth in claim 27 wherein the reader imager includes a lens having an aperture and wherein the imager side of the transparent plate is located coincident with the aperture.

29. The handheld symbology reader as set forth in claim 28 wherein the imager side of the transparent plate includes, in the transparent spaces external of the aperture an opaque coating.

* * * * *